April 3, 1951 J. G. HEYCK 2,547,911
RAIN-GUARD FOR AUTOMOBILE VENTILATING WINDOWS
Filed Oct. 14, 1949 2 Sheets-Sheet 2
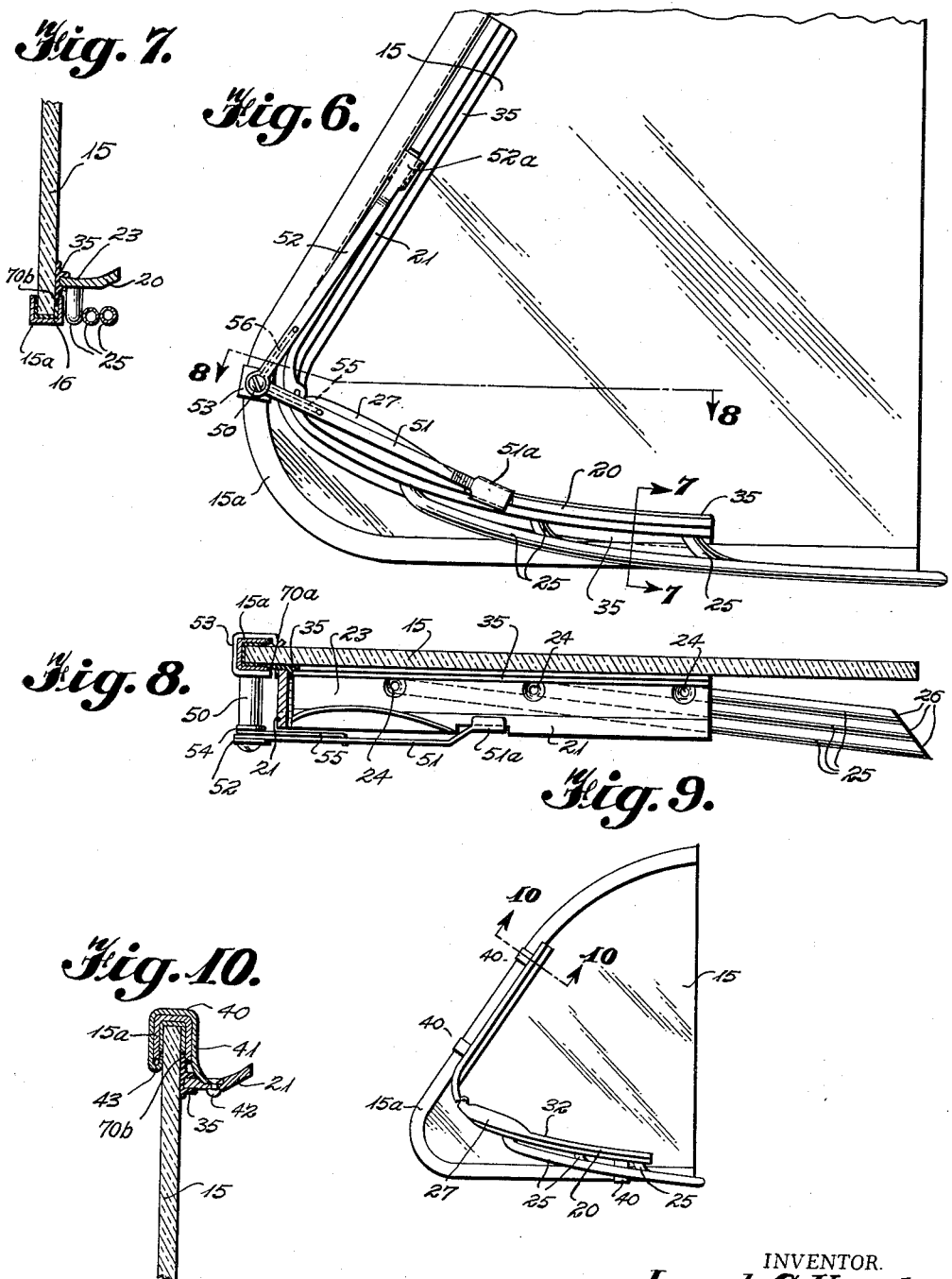
INVENTOR.
Joseph G. Heyck
BY
ATTORNEY Patented Apr. 3, 1951

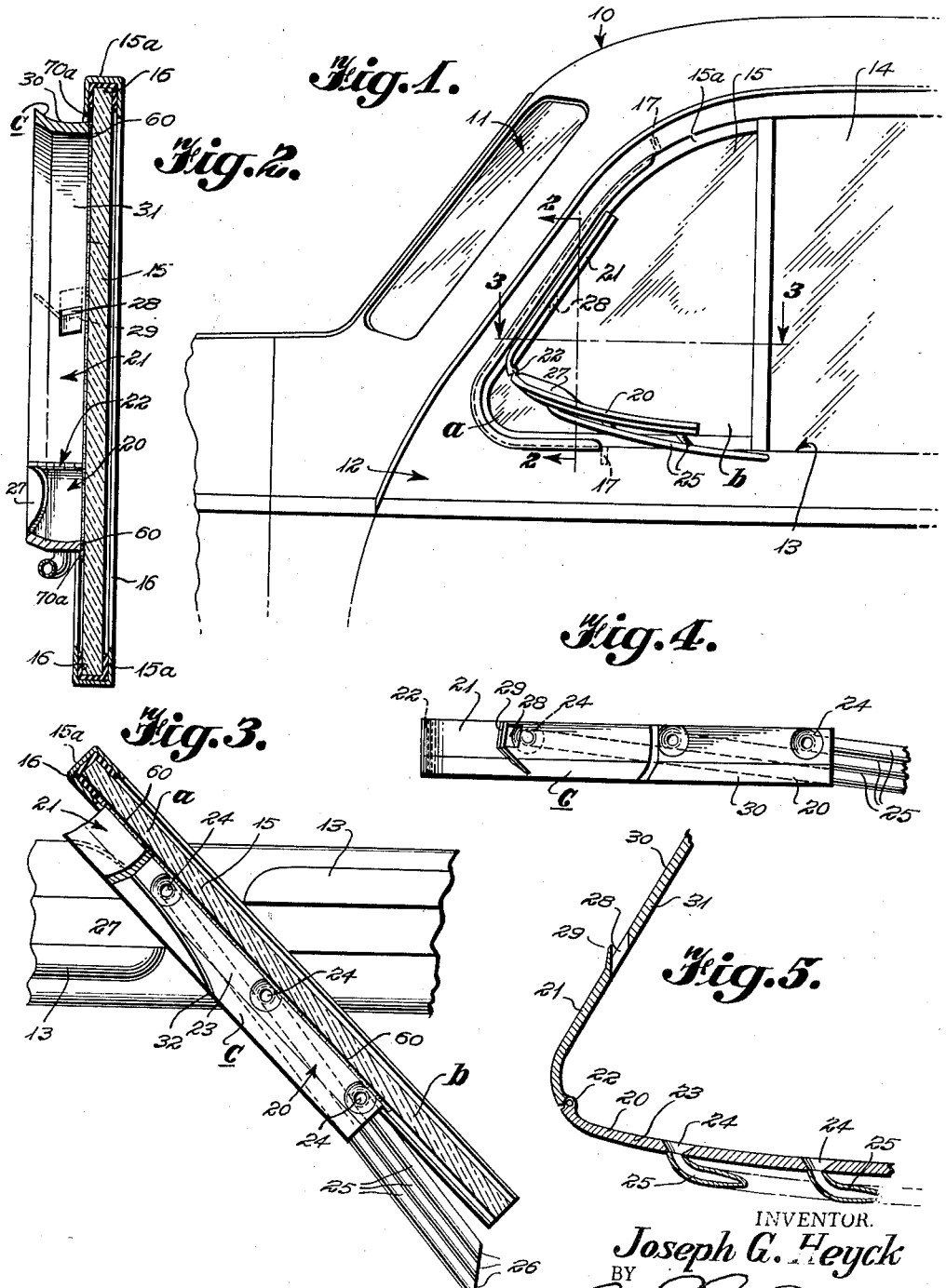

2,547,911

UNITED STATES PATENT OFFICE 2,547,911

RAIN GUARD FOR AUTOMOBILE VENTILATING WINDOWS

Joseph G. Heyck, Tampa, Fla.

Application October 14, 1949, Serial No. 121,313

12 Claims. (Cl. 296—44)

This invention relates to rain-guards for non-draft ventilating windows of automobiles and other vehicles and more particularly relates to a device which may be attached to such a ventilating window of an automobile or other vehicle to keep rain, which hits the outside of the window, from entering the vehicle when the window is open and the vehicle is being driven in the rain.

By the expression "non-draft ventilating window of automobiles or other vehicles" is meant the customary windows on the sides of the vehicles and which are pivoted intermediate their forward and rear edges to swing on a vertical or tilted axis in a generally horizontal plane and upon being opened the portion to the rear of the axis swings outwardly of the vehicle and the portion forwardly of the axis swings inwardly of and usually into the vehicle. When these windows are open and the vehicle is traveling forward air is deflected by them forwardly into the vehicle for the well known purpose of causing a circulation of air within the vehicle without causing strong drafts of air upon its occupants.

However, the draft of air which flows forwardly along the outside of these ventilating windows, when open and the vehicle is in motion, tends when it is raining, to carry rain striking the outside of the window forwardly thereon and into the vehicle. This is very objectionable and it has been proposed heretofore to attach some sort of a deflector or guard to the outside of the ventilating window or about the window opening to further deflect said air currents or to prevent rain water from being driven by the air currents into the car when the car is traveling in rain. These prior rain-guards or deflectors for the ventilating windows have not been entirely successful in serving their intended purpose and it is a principal object of my invention to provide an improved rain-guard and rain deflector for a ventilating window of an automobile or other vehicle, and one which not only more positively prevents rain water from reaching the interior of the vehicle when the vehicle is being driven in the rain but also is of improved construction.

Another object of this invention is to provide a rain-guard or rain deflector of the character described for ventilating windows of automobiles or other vehicles and which is adjustable to fit such ventilating windows of various contours and to be either permanently or removably applied thereto.

Another object of this invention is to provide a rain-guard or rain deflector of the character described adapted to be applied either permanently or removably to a ventilating window of an automobile or other vehicle and which is so constructed that without detachment from the window it permits access to the entire surface of the window for cleaning, polishing or the like.

Another object of this invention is to provide a rain-guard or rain deflector of the character described and which is provided with novel means whereby the guard or deflector may be attached to and secured in place on the window.

Further objects of this invention include the provision of a rain-guard or rain deflector of the character stated and which is simple, durable and inexpensive in construction and may be applied to a window in proper position thereon quickly and easily and, when properly positioned on a window, is extremely effective in preventing rain water from being blown along the window into the interior of the car when the window is open and the vehicle is traveling in the rain.

Other objects of this invention will be in part obvious and in part pointed out hereinafter.

Heretofore it has been proposed to attach a rigid channel member or deflecting vane to the outside of the forward section of a ventilating window of a vehicle to prevent rain water from flowing along the window forwardly and into the vehicle. By reason of the rigidity of such rain-guards they have not been adapted for different shapes of windows; and, furthermore with these guards, the wind blowing forwardly along the window tends to blow the rain water flowing out of the lower end of the guard into the car or the wind blowing along the window causes the accumulated rain water at or just in advance of the forward portion of the rain-guard to overflow the side of the guard and spray it into the interior of the car. In accordance with my invention, these objections are overcome.

My improved guard is of elbow-shape having the two arms of the elbow connected so that the guard may be relatively movable or flexed to fit various shapes of ventilating windows of vehicles. In my improved guard, means are also provided to prevent the wind from backing-up an accumulation of rain water at the elbow, said means, in fact, positively serving to withdraw water tending to accumulate at or rearwardly of the elbow and to discharge such water outside of the vehicle. Further, my improved rain-guard is provided with means for conducting any water which may find its way to the leeward side of the guard back to the windward side for discharge on the outside of the vehicle. Means may also be provided for removably mounting the guard on a window; or means for permanently attaching the guard in place on a window may be provided. These and other features of this invention will be referred to hereafter.

The invention accordingly consists in the features of constructions, combinations of elements and arrangements of parts which will be set forth hereinafter and the scope of the application of which will be set forth in the claims that follow.

In order that a clearer understanding of this invention may be had, attention is hereby directed to the accompanying drawings forming a part of this application and illustrating certain possible embodiments of this invention and in which:

Figure 1 is a fragmentary elevation of the body of an automobile equipped with a front ventilating window having one form of a rain-guard embodying this invention applied thereto, the window being shown closed;

Figure 2 is a vertical sectional view through the window and rain-guard and is taken on the line 2—2 of Fig. 1;

Figure 3 is a horizontal sectional view thereof with the window shown open and is taken on the line 3—3 of Fig. 1;

Figure 4 is a top view of a rain-guard embodying this invention and devoid of attaching means;

Figure 5 is a longitudinal sectional view of a fragment of a rain-guard embodying this invention showing the hinge connection between the two arms of the guard;

Figure 6 is a fragmentary elevation of the front section of a front ventilating window showing the guard applied thereto and one possible means whereby the guard is attached to the window;

Figure 7 is a sectional view of a portion thereof and is taken on the line 7—7 of Fig. 6;

Figure 8 is another sectional view thereof and is taken on the line 8—8 of Fig. 6;

Figure 9 is a fragmentary elevation of the front section of a front ventilating window and a guard applied thereto and shows another possible modification of the means for attaching the guard in place on the window; and Figure 10 is a sectional view thereof and is taken on the line 10—10 of Fig. 9.

Similar reference characters refer to similar parts throughout the several views of the drawings.

While it is to be understood that the rain-guard of this invention is applicable to ventilating windows of the kind above indicated that may be disposed at both the front and rear portions of a vehicle body, the drawings illustrate the rain-guard as applied to the front ventilating windows.

Referring to the drawings, 10 denotes an automobile body having a windshield portion 11 and side-door 12 provided with a window opening 13. The rear portion of the window opening 13 is equipped with the usual sliding window pane 14 and, in its forward portion, with the, so-called, ventilating window pane 15. The ventilating window pane 15 is usually provided with a sash or border framing 15a channel shaped in cross section and in this channel of the framing is disposed the glass window pane 15, the framing embracing the top, bottom and forward edge of the pane. The framing 15a may be of any shape or design which conforms with the general contour of the window opening portion in which it is disposed. In order to cushion the glass pane 15, there is interposed between it and the inner surfaces of channel framing 15a a lining or padding 16 which is co-extensive with the channel surface. This type of ventilating window 15 is arranged to be moved so that its forward end portion a will extend within the vehicle body and its rear end b will extend outwardly from the body when moved from closed position, as shown in Figure 3; and, to this end, usually the framing 15a is pivotally mounted to the window opening frame about a substantially vertical axis, as at 17, intermediate its front and rear edges and suitable operating means, not shown, is employed to effect the opening and closing of the window 15. All of the construction just described is more or less conventional and is illustrated herein for the convenient purpose of an example of the type of ventilating window to which the invention is particularly adaptable.

As shown in the drawings, my improved rain-guard includes two rain deflecting blades 20 and 21, which are movable relative to each other. The lower blades 20 and the upper blades 21 are shown preferably, hinged together end-to-end as by hinge 22, but may be integrally and flexibly jointed at 22, so as to conform to the shape of the pane 15, to which the guard is to be applied, with the blade 21 close against the outer surface of the window pane 15 in close proximity with the adjacent portion of the frame 15a and with the lower blades 20 extending from the hinge 22 generally rearwardly and with downward inclination along the lower portion of the window pane as shown in Figs. 1, 6 and 9. In such positions of the blades on the pane 15, the rain driven forwardly over the outer surface of the pane 15 will be caught by the upwardly extending arm 21 and deflected thereby toward the blade 20 and rain flowing down the outer surface of said window is caught by the rearwardly extending blade 20 and conducted thereby rearwardly and discharged from the rear end of the blade 20. The guard, so constructed, may be placed and held in operative position on the window pane 15 by suitable means, three of such improved means for the purpose being shown in the drawings and will be described specifically hereinafter.

The blades 20 and 21 of the rain-guard have certain other improved structural features which add to its efficacy. Accordingly the upper faces or surfaces or the blades 20 and 21 have a generally concaved formation transversely thereof so as to provide an upwardly extending curb or rim c longitudinally above their outer side-edges so as to form, with the window pane 15 and the run 15a, a better gutter for catching and conducting therealong the rain water received. To aid in draining rain water from the upper surface 23 of lower blade 20, this blade may be curved longitudinally, as shown, and provided with one or more drain openings 24 which extend through the blade from its upper surface 23 and for each drain opening the blade is provided with a drain tube 25 in communication with a drain opening 24 and is disposed below the blade and extends rearwardly to adjacent the rear edge of the window pane 15 when the guard is in place thereon. It is preferred to provide three openings 24 in the blade 20, one each at the end portions of the blade and one at its center portion; and the rear ends of the drain tube 25 are preferably cut on a slant as at 26 (Fig. 3), the slant being in a vertical plane and forwardly toward the window pane, so that when the window is opened the slanting ends 26 of the tubes 25 will be brought toward a substantially right angular relation to the direction of travel of the vehicle (indicated by the arrow in Fig. 3) on which the guard is mounted and air passing rearwardly past the ends of the tubes 25 will create suction in the tubes and draw out water that may be present in the tubes. As shown, the rear end portions of the tubes 25 protrude rearwardly of the rain catching surface 23 of the blade, but, if desired, the surface 23 of the blade may extend as far to the rear as do the tubes 25. These drain openings 24 and drain tubes 25 tend to prevent the wind from backing-up rain water near the elbow of the guard, as the wind tends to do; and to further guard against any such accumulation of water from spilling over the outer side-edge 32 of the blade, an upwardly extending and inwardly overhanging flange 27 is formed along a portion of the outer side-edge 32 of the blade 20 adjacent the elbow of the guard.

The upwardly extending blade 21 has a drain opening 28 therein at a point intermediate thereof that will extend into the interior of the vehicle when the pane 15 is open and has an upstanding lip or dam 29 along the side of the drain opening 28 which is toward the connected ends of the blades. The function of this drain opening 28 is to conduct through the blade any water that may accumulate on the top surface of the outwardly extending portion 30 of the blade and frame 15a and deliver it to the rain catching side 31 thereof, the lip 29 stopping and deflecting into the drain opening 28 any water tending to pass over the opening.

The guard, thus described, may be made of plastic, metal or other suitable material, and, as one simple manner of securing and holding the rain-guard in place on a window pane 15, a suitable adhesive 60 (Figs. 1, 2 and 3) is applied to the side-edges of the blades 20 and 21 that are in contiguous relation with the pane 15 and which adheres the blades to the glass of the window pane. One special way of using for the purpose an adhesive now available is to provide an elbow-shaped strip having pre-set adhesive 60 thereon, with the angularity of the elbow being approximately the same as the angularity between the blades of the rain-guard when placed in proper position on a window pane. Then, when it is desired to attach the rain-guard to the window pane, one side of the pre-set adhesive strip 60 is activated by application of a suitable activator material and adhered to the blades of the rain-guard and, then, the other surface of the pre-set adhesive strip 60 is so activated; and the strip with the rain-guard adhered thereto is placed in proper position against and adhered to the window pane 15.

Another improved manner of securing and holding the rain-guard, above described, in place on a window pane 15 is shown in Figs. 6 and 8, wherein a post 50 having two spring arms 51 and 52 pivoted thereon with each arm 51 and 52 connected to an intermediate portion or contacting one of the blades 20 and 21, respectively, in such a way as to press the same against the window pane on which the guard is mounted, means being provided for securing the post to the window pane 15. As shown, such mounting means may be in the form of a suitable U-shaped spring clip 53 which carries the post 50 and which may be clipped in place about the framing 15a of the window pane. The connection between the arms 51 and 52 and the blades 20 and 21 may comprise channel members 51a and 52a on the free ends of the arms and which removably straddle the outer edges of the blades 20 and 21. In addition, a coil spring 54 may be supported on the post with its opposite ends 55 and 56 connected to the blades 20 and 21 and so tensioned as to resiliently urge the blades to move away from each other; such movement of the blades being limited by their engagement with the edge of the framing 15a of the window pane. With this mounting the blades 20 and 21 may be lifted away from the window pane 15 against the action of the spring arms 51 and 52 to expose the surface of the window pane beneath the blades for cleaning, polishing and the like.

Still a further improved manner of securing and holding the rain-guard in place on the pane 15, is by means of U-shaped spring clips 40 (Figs. 9 and 10) which are fastened at one side 41 to the blades 20 and 21 of the guard as by rivets 42, or the like, the clips 40 being adapted to be engaged about the window pane framing 15a and having an inwardly extending lip 43 which snugly fits over the edge of the framing 15a on the opposite side of the pane 15 from the guard. With spring clips of this type the guard may be removed from the window pane by merely springing the clips out of engagement with the window pane framing.

When employing the fastener or attaching means shown and described in connection with Figs. 6, 8, 9 and 10, or like means, it is desirable to use strips 35 of rubber or other suitable material which cushion the contact between the blades 20 and 21 and the pane 15 and prevent rain from passing between the blades and the window pane. As shown, these strips may be of rubber and of channel form with the inner side-edges of the blades contiguous the pane 15 seated and held in the channels of the rubber strips. When pressed against the window pane 15, these rubber channel strips 35 flatten and make a very water-tight seal between the blades and the pane. Further and preferably, the adhesive strip 60 and the rubber channel edge strips 35 are formed with narrow lips 70a and 70b extending along one edge thereof, these lips toward the rear end of the lower blade 20 and along the upper end of the other blade 21 being adapted to fit into the slight depression between the metal of the framing 15a and the window pane 15 and further aid in preventing rain water from seeping through under the blades of the guard and into the vehicle.

It is apparent from the above that various different embodiments of my invention and various changes in the construction may be had without departing from the scope of this invention, and it is to be understood that all matter contained in the above description and shown in the drawings is to be interpreted as illustrative and not in a limiting sense.

That which is claimed, as new, is:

1. A rain-guard of the character described including two rain deflector blades articulately joined at one of their ends and adapted to be angularly disposed one to the other, and means associated with said blades and engageable with a ventilating window pane of a vehicle for holding said blades closely against the outer surface of said window pane with one of said blades extending from its joined end generally rearwardly and with downward inclination along the lower portion of said pane and with the other blade extending from its joined end generally upwardly along the pane, whereby rain driven forwardly over the outer surface of said window pane is caught by said upwardly extending blade and deflected thereby toward the other blade and rain flowing down the outer surface of said window pane is caught by said rearwardly extending blade and conducted thereby rearwardly and discharged from the rear end of said blade.

2. A rain-guard as set forth in claim 1 and in which said means includes a post attachable to said window pane, and spring arms mounted on the post and secured to and supporting each of said arms and resiliently pressing said blades against said window pane, when the rain-guard is in place thereon.

3. A rain-guard as set forth in claim 1 and in which each blade has a cushion strip on the inner side-edges thereof, and in which said means includes a post attachable to said window pane and spring arms mounted on the post and in removable engagement with each blade, respectively, and resiliently pressing said cushion stripped edges of the blades against the window pane when the rain-guard is in place thereon.

4. A rain-guard as set forth in claim 1 and in which said means includes a post attachable to said window pane, spring arms pivoted on said post and having channelled end portions adapted to straddle the outer edges of said blades, respectively, and resiliently pressing said blades against said window pane, when the rain-guard is in place thereon, and spring means mounted on the post and engaging both of said arms resiliently urging said arms to pivot on said post away from each other, said window pane having marginal framing adapted to be engaged by said blades, thus limiting the extent of separation of said arms by said spring means.

5. A rain-guard of the character described, including two rain deflector blades connected together at one of their ends and adapted to be placed and held closely against the outer surface of a ventilating window pane of a vehicle with one of said blades extending from its connected end generally rearwardly along the lower portion of said pane and with the other blade extending from its connected end generally upwardly inclined along the pane, whereby rain driven forwardly over the outer surface of said window pane is caught by said upwardly extending blade and deflected thereby toward the other blade and rain flowing down the outer surface of said window pane is caught by said rearwardly extending blade and conducted thereby rearwardly, the rain catching surface of said rearwardly extending blade having curvature both longitudinally and transversely and having a drain opening therethrough where the blade has longitudinal curvature.

6. A rain-guard of the character described, including two rain deflector blades connected together at one of their ends and adapted to be placed and held closely against the outer surface of a ventilating window pane of a vehicle with one of said blades extending from its connected end generally rearwardly along the lower portion of said pane and with the other blade extending from its connected end generally upwardly inclined along the pane, whereby rain driven forwardly over the outer surface of said window pane is caught by said upwardly extending blade and deflected thereby toward the other blade and rain flowing down the outer surface of said window pane is caught by said rearwardly extending blade and conducted thereby rearwardly, said rearwardly extending blade including a drain opening at an intermediate point in the rain catching surface of the blade, and a drain tube in communication with said drain opening and extending rearwardly thereof.

7. A rain-guard of the character described, including two rain deflector blades connected together at one of their ends and adapted to be placed and held closely against the outer surface of a ventilating window pane of a vehicle with one of said blades extending from its connected end generally rearwardly along the lower portion of said pane and with the other blade extending from its connected end generally upwardly inclined along the pane, whereby rain driven forwardly over the outer surface of said window pane is caught by said upwardly extending blade and deflected thereby toward the other blade and rain flowing down the outer surface of said window pane is caught by said rearwardly extending blade and conducted thereby rearwardly, said rearwardly extending blade including a plurality of drain openings in and spaced along the rain catching surface of the blade, and a drain tube in communication with each of said drain openings and extending rearwardly thereof to adjacent the rear edge of said window pane, the rear end surfaces of said drain tubes being slanted horizontally in a direction forwardly toward the window pane whereby, when the pane is open, wind passing by the rear end of the tube creates suction therein and tends to draw therefrom water present in the tube.

8. A rain-guard of the character described, including two rain deflector blades connected together at one of their ends and adapted to be placed and held closely against the outer surface of a ventilating window pane of a vehicle with one of said blades extending from its connected end generally rearwardly along the lower portion of said pane and with the other blade extending from its connected end generally upwardly inclined along the pane, whereby rain driven forwardly over the outer surface of said window pane is caught by said upwardly extending blade and deflected thereby toward the other blade and rain flowing down the outer surface of said window pane is caught by said rearwardly extending blade and conducted thereby rearwardly, said rearwardly extending blade including a plurality of drain openings in and spaced along the rain catching surface of the blade, and a drain tube in communication with each drain opening and extending rearwardly thereof.

9. A rain-guard of the character described, including two rain deflector blades connected together at one of their ends and adapted to be placed and held closely against the outer surface of a ventilating window pane of a vehicle with one of said blades extending from its connected end generally rearwardly along the lower portion of said pane and with the other blade extending from its connected end generally upwardly inclined along the pane, whereby rain driven forwardly over the outer surface of said window pane is caught by said upwardly extending blade and deflected thereby toward the other blade and rain flowing down the outer surface of said window pane is caught by said rearwardly extending blade and conducted thereby rearwardly, said upwardly extending blade having a drain opening therethrough intermediate its ends adapted to pass water from the top side of the blade to the rain facing side of the blade.

10. A rain-guard of the character described, including two rain deflector blades connected together at one of their ends and adapted to be placed and held closely against the outer surface of a ventilating window pane of a vehicle with one of said blades extending from its connected end generally rearwardly along the lower portion of said pane and with the other blade extending from its connected end generally upwardly inclined along the pane, whereby rain driven forwardly over the outer surface of said window pane is caught by said upwardly extending blade and deflected thereby toward the other blade and rain flowing down the outer surface of said window pane is caught by said rearwardly extending blade and conducted thereby rearwardly, said upwardly extending blade having a drain opening at an intermediate point between its ends, and the surface of the blade opposite its rain catching surface having transverse concave formation from said drain opening toward the free end of the blade.

11. A rain-guard of the character described, including two rain deflector blades connected together at one of their ends and adapted to be placed and held closely against the outer surface of a ventilating window pane of a vehicle with one of said blades extending from its connected end generally rearwardly along the lower portion of said pane and with the other blade extending from its connected end generally upwardly inclined along the pane, whereby rain driven forwardly over the outer surface of said window pane is caught by said upwardly extending blade and deflected thereby toward the other blade and rain flowing down the outer surface of said window pane is caught by said rearwardly extending blade and conducted thereby rearwardly, said upwardly inclined blade having a drain opening in its upper surface at an intermediate point between its ends and an outwardly extending water deflecting lip at the lower edge portion of said drain opening, whereby rain flowing down said surface across said drain opening is deflected back into said opening.

12. In a rain-guard of the character described, including a rain deflector blade means adapted to be placed and held closely against the outer surface of a ventilating window pane of a vehicle with a portion of said blade means extending generally rearwardly along the lower portion of said pane, whereby rain flowing down the outer surface of said window pane is caught by said rearwardly extending blade portion, said rearwardly extending blade portion having a drain opening in the rain catching surface thereof, and a drain tube in communication with said drain opening and being of a length to extend rearwardly thereof to a point adjacent and slightly beyond the rear edge of said window pane, the rear end surface of said drain tube being slanted horizontally in a direction forwardly toward the window pane whereby, when the pane is open, wind passing by the rear end of the tube creates suction therein and tends to draw therefrom water present in the tube.

JOSEPH G. HEYCK.

REFERENCES CITED

The following references are of record in the file of this patent:

UNITED STATES PATENTS

| Number | Name | Date |
|---|---|---|
| 2,229,978 | Andrews | Feb. 4, 1936 |
| 2,119,635 | Griffith | June 7, 1938 |
| 2,263,860 | Schell | Nov. 25, 1941 |
| 2,354,443 | Schirra | July 25, 1944 |
| 2,451,399 | Martin | Oct. 12, 1948 |
| 2,478,161 | Russell | Aug. 2, 1949 |
| 2,500,991 | Kent | Mar. 21, 1950 |